United States Patent

Komada et al.

Patent Number: 5,551,401
Date of Patent: Sep. 3, 1996

[54] AIR SUCTION SYSTEM FOR INTERNAL COMBUSTION ENGINE

[75] Inventors: Hideki Komada; Takahiro Muramatsu; Yuji Yamamoto, all of Shizuoka-ken, Japan

[73] Assignee: Suzuki Motor Corporation, Shizuoka, Japan

[21] Appl. No.: 394,578

[22] Filed: Feb. 27, 1995

[30] Foreign Application Priority Data

| May 31, 1994 | [JP] | Japan | 6-141035 |
| May 31, 1994 | [JP] | Japan | 6-141036 |
| May 31, 1994 | [JP] | Japan | 6-141037 |

[51] Int. Cl.⁶ .................................................. F02M 51/00
[52] U.S. Cl. ................................................... 123/472
[58] Field of Search ............................ 123/308, 432, 123/470, 472

[56] References Cited

U.S. PATENT DOCUMENTS

| 4,955,347 | 9/1990 | Toyoda | 123/432 |
| 5,048,500 | 9/1991 | Curhan | 123/470 |
| 5,054,456 | 10/1991 | Rush, II et al. | 123/470 |
| 5,138,989 | 8/1992 | Fraidl et al. | 123/308 |

FOREIGN PATENT DOCUMENTS

| 1229142 | 9/1960 | France | 123/470 |
| 5768557 | 4/1982 | Japan | 123/432 |
| 61-147336 | 9/1986 | Japan . | |
| 4-47165 | 4/1992 | Japan . | |
| 4234565 | 8/1992 | Japan | 123/472 |
| 4-262063 | 9/1992 | Japan . | |

Primary Examiner—Erick R. Solis
Attorney, Agent, or Firm—Flynn, Thiel, Boutell & Tanis, P.C.

[57] ABSTRACT

An air suction system for an internal combustion engine in which one of two air intake port sections is provided with an air intake control valve to provide enhanced atomization and ensure a sufficient airflow. The air suction system, according to an embodiment of the invention, has a passage cross-section of a first injection passage portion which is greater in area than that of a second injection passage portion. The first and second injection passage portions respectively communicate with the first and second intake port sections. In a variation, the first and second injection passage portions have passage cross-sections adjacent to the first and second nozzle hole portions of smaller cross-sectional area, and the first and second injection passage portions have passage cross-sections adjacent the first and second intake port sections of larger cross-sectional area. In a further variation, the first and second injection passages are formed with taper-shaped configurations such that the area of each passage increases progressively in a direction toward the first and second intake ports and away from the air intake control valve.

4 Claims, 6 Drawing Sheets

AIR SUCTION SYSTEM FOR INTERNAL COMBUSTION ENGINE

FIELD OF THE INVENTION

This invention relates to an air suction system for an internal combustion engine. More particularly, it relates to an improved air suction system for an internal combustion engine in which one of two intake port sections is provided with an air intake control valve to provide enhanced atomization and ensure a sufficient airflow.

More particularly, the invention relates to an improved air suction system for an internal combustion engine which can avoid a reduction in swirl ratio and can cause fuel flow through a second intake port section without allowing the fuel to reside and adhere to that portion section, and can further force fuel to flow through first and second injection passage portions without allowing the fuel to be stagnantly affixed to these two passage portions.

BACKGROUND OF THE INVENTION

Among internal combustion engines disposed in vehicles and the like, there is one type of engine in which an air suction system is provided by way of a countermeasure to cope with problems such as fuel consumption rates and harmful exhaust components. This air suction system is designed to achieve improvements in combustibility by imparting swirl to air that enters a combustion chamber or a cylinder.

Some of the above air suction systems are constructed in such a manner that an air intake port of an internal combustion engine is partitioned by a partition wall into first and second intake port sections. These two intake port sections separately open into a single combustion chamber of the internal combustion engine. The second intake port section has an air intake control valve positioned therein. This control valve selectively provides opening and closing actions depending upon an engine-running state. The partition wall has first and second injection passage portions defined therein. One ends of the first and second injection passage portions are brought together at a convergence portion. The other ends of the same two injection passage portions respectively lead into the first and second intake port sections on a downstream side of the air intake control valve. The other ends of the first and second injection passage portions are directed toward the combustion chamber. The partition wall is provided with a fuel injection valve which has first and second nozzle hole portions oriented toward the combustion chamber respectively through the first and second injection passage portions.

Such air suction systems for the internal combustion engines are disclosed in published Japanese Patent Application Laid-Open No. 4-262063, Japanese Utility Model Application Laid-Open No. 61-147336, and Japanese Utility Model Application Laid-Open No. 4-47165.

An air suction system taught by Publication No. 4-262063 is intended for use in an internal combustion engine in which a swirl port and a straight port is provided, both of which communicate with a single combustion chamber. The straight port is provided with an air intake control valve which provides a closing action under predetermined engine load conditions. Further, a partition wall for separating these two ports is provided with a communication passage on a downstream side of the air intake control valve. The communication passage intercommunicates the swirl port and the straight port. In addition, a fuel injection valve having two nozzle holes is disposed in the communication passage. The air suction system is characterized in that the partition wall is formed with projections on a wall surface thereof on the swirl port side. The projections are located on a downstream side of the communication passage. The projections produce the breakdown of a flow of intake air over the wall surface.

According to another air intake system shown in aforementioned Publication No. 61-147336, first and second air intake ports communicate with a combustion chamber via air intake valves. The first intake port is helically shaped, while the second intake port is straightly shaped. The second intake port is provided with an air intake control valve. This control valve is closed at low speed and light load regimes of an internal combustion engine. A fuel injection valve having two nozzle holes is mounted in such a manner that the nozzle holes are respectively opened into the first and second ports by a partition wall at a location between the air intake control valve and the air intake valve. The partition wall separates the first intake port from the second intake port.

According to yet another air intake system carried by the aforesaid Publication No. 4-47165, first and second air intake ports communicate with a single cylinder. The second intake port has an air intake control valve positioned therein. This control valve selectively provides opening and closing actions in response to an engine-running state. A partition wall for separating these two ports is provided with first and second injector ports. A fuel injection valve having two nozzle holes is disposed at a location where the first and second injector ports are joined together. An upper edge of the partition wall is position in a downstream direction from upstream ends of openings of the first and second injector ports, the openings leading into the first and second intake ports.

In conventional air suction systems, there is an inconvenience in that a swirl ratio during air suction decreases with an increase in the area of each passage cross-section of first and second injection passage portions. These two injection passage portions are communication apertures which intercommunicate first and second air intake port sections.

Another inconvenience occurs when the aforesaid communication apertures, or rather the first and second injection passage portions, are formed in such a manner that the respective passage cross-sections thereof are reduced in area in order to overcome the aforesaid problem. That is, an insufficient air current flows into the second intake port section when the air intake control valve is closed. As a result, fuel adheres to an inner wall surface that forms the second intake port section.

A further inconvenience arises when fuel is ejected through the aforesaid first and second injection passage sections. That is, the air current, which flows through the first and second injection passage portions, blocks fuel from being injected into the first intake port section.

To obviate the aforesaid inconveniences, the present invention provides an air suction system for an internal combustion engine in which an air intake port of the internal combustion engine is partitioned by a partition wall into first and second intake port sections which separately communicate with a single combustion chamber of the internal combustion engine, the second intake port section being provided with an air intake control valve which selectively provides opening and closing actions depending on an engine-running state, the partition wall being defined with first and second injection passage portions whose one ends are joined together at a location of the partition wall, the other ends of the first and second injection passage portions being respectively in communication with the first and second intake port sections on a downstream side of the air intake control valve, the other ends of the first and second injection passage portions being oriented toward the combustion chamber, the partition wall being provided with a fuel injection valve which has first and second nozzle hole portions directed toward the combustion chamber respectively through the first and second injection passage portions;

the improvement according to a first embodiment wherein a passage cross-section of the first injection passage portion is established to be greater in area than that of the second injection passage portion;

the improvement according to a second embodiment wherein the first and second injection passage portions are configured in such a manner that respective passage cross-sections thereof adjacent to the first and second nozzle hole portions have an area equal to a predetermined smaller cross-sectional area, and wherein the first and second injection passage portions are configured such that respective passage cross-sections thereof on the sides of the first and second intake port sections have an area equal to a predetermined larger cross-sectional area, the predetermined larger cross-sectional area being greater than the predetermined smaller cross-sectional area; and the improvement according to a further embodiment wherein the first and second injection passages are formed with taper-shaped configurations such that the area of each passage cross-section increases in stages in the direction of the first and second intake ports away from the side of the air intake control valve.

According to the first embodiment of the invention having the above structure, some of an air current flowing in the first intake port section is led into the second intake port section through the first and second injection passage portions when the air intake control valve is closed. This stream of airflow eliminates the likelihood that fuel resides and adhere to respective inner wall surfaces of the second injection passage portion and the second intake port section. In addition, the passage cross-section of the first intake port section is established to be greater in area than that of the second injection passage portion. The first and second injection passage portions respectively communicate with the first and second intake port sections. As a result, although some of the airflow in the first intake port section is brought into the second intake port section, fuel is injected into the first intake port section without being interrupted by the aforesaid partial airflow.

When the air intake control valve is opened, fuel from the fuel injection valve is supplied to the first and second intake port sections respectively through the first and second injection passage portions. The supplied fuel is then smoothly introduced into the combustion chamber, together with respective airflows in the first and second intake port sections.

According to the second embodiment of the invention having the above structure, the first and second injection passage portions are configured in such a manner that respective passage cross-sections thereof adjacent to the first and second nozzle hole portions of the fuel injection valve have an area equal to a predetermined smaller cross-sectional area. This arrangement can ensure a proper stream flow of air from the first intake port section to the second intake port section to avoid reducing a swirl ratio during air suction. Further, the first and second injection passage portions are formed in such a manner that respective passage cross-sections thereof on the sides of the first and second intake port sections have an area equal to a predetermined larger cross-sectional area which is greater than the aforesaid predetermined smaller cross-sectional area. This configuration enables ejection of fuel in a wider range of injection without allowing the fuel to contact respective wall surfaces of the first and second injection passage portions.

DETAILED DESCRIPTION

Embodiment of FIGS. 1–4:

A first embodiment of the invention will now be described in detail with reference to FIGS. 1–4.

Figure 1:
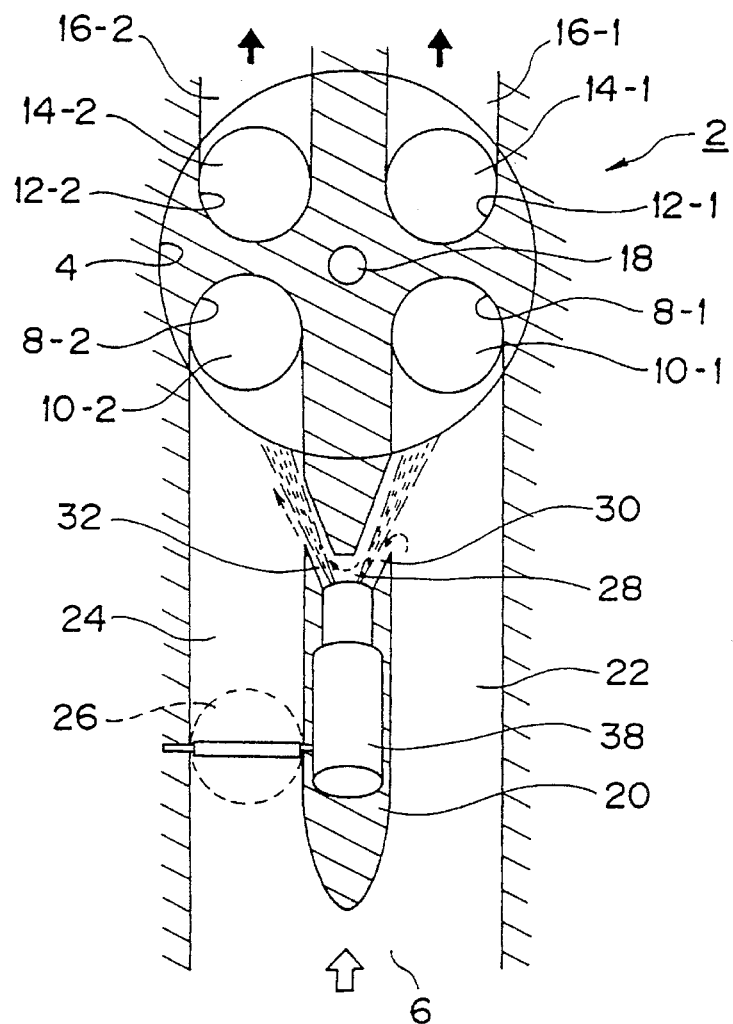
FIG. 1 is a schematic, cross-sectional view illustrating an air suction system for an internal combustion engine according to a first embodiment of the invention.

In FIG. 1, reference numeral 2 denotes an internal combustion engine; 4 a combustion chamber; 6 an air intake port; 8-1 and 8-2 first and second inlets; 10-1 and 10-2 first and second inlet valves; 12-1 and 12-2 first and second outlets; 14-1 and 14-2 first and second outlet valves; 16-1 and 16-2 first and second air discharge ports; and 18 an ignition plug.

The air intake port 6 is partitioned by a partition wall 20 into first and second intake port sections 22 and 24. These two intake port sections 22 and 24 communicate with the combustion chamber 4.

The second intake port section 22 has an air intake control valve 26 positioned therein. This control valve 26 selectively provides opening and closing actions, depending on how the internal combustion engine 2 is working.

The partition wall 20 has first and second injection passage portions 30 and 32 defined therein. One ends of these two injection passage portions 30 and 32 are joined together at a convergence portion 28. The convergence portion 28 is located at a central portion of the partition wall 20. The other ends of the first and second injection passage portions 30 and 32 are respectively open to the first and second intake port sections 22 and 24 on a downstream side of the air intake control valve 26. The other ends of the same injection passage portions 30 and 32 are oriented toward the combustion chamber 4 along first and second centerlines $C_1$ and $C_2$ (FIG. 2).

Figure 2:
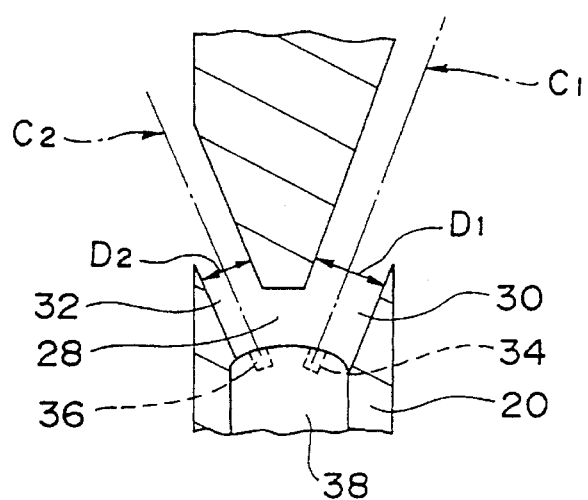
FIG. 2 is an enlarged, cross-sectional view showing a primary portion of FIG. 1.

As shown in FIG. 2, the first injection passage portion 30 is formed such that a passage cross-section thereof has an area defined by a predetermined constant diameter $D_1$. The second injection passage portion 32 is formed such that a passage cross-section thereof has an area defined by a predetermined constant diameter $D_2$. The latter diameter $D_2$ is smaller than the former diameter $D_1$.

The partition wall 20 has a fuel injection valve 38 positioned at the convergence portion 28. The fuel injection valve 38 has first and second nozzle hole portions 34 and 36. In the fuel injection valve 38, the first nozzle hole portion 34 is oriented toward the first injection passage portion 30, while the second nozzle hole portion 36 is directed toward the second injection passage portion 32.

The operation of the embodiment of FIGS. 1–4 will now be described.

Figure 3:
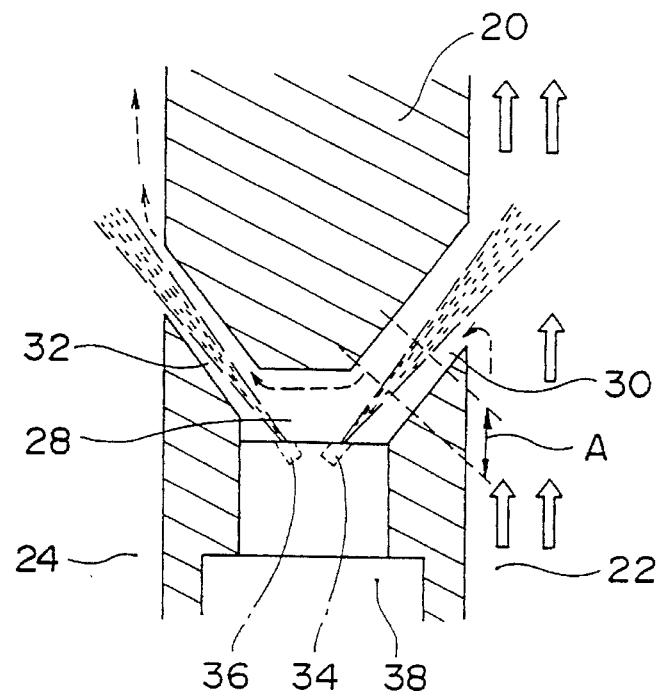
FIGS. 3 and 4 are cross-sectional views corresponding to FIG. 2 but respectively showing the air intake control valve in closed and open states.

As illustrated in FIG. 3, when air intake control valve 26 remains closed, an upstream side of second intake port section 24 is closed by valve 26. However, some of the airstream flowing in an upstream side of first intake port section 22 is diverted into first injection passage portion 30. The diverted airstream is further advanced into second injection passage portion 32 through a convergence passage portion 28. Thereafter, the diverted airstream is introduced into the second intake port section 24 on a downstream side of the air intake control valve 26.

At this time, fuel to be injected from first nozzle hole portion 34 into the first intake port section 22 is atomized without interruption because the passage cross-section (i.e. area) of the first injection passage portions 30 is greater than the area of the second injection passage portion 32. In addition, the first injection passage portion 30 provides a reduced flow irregularity and less resistance to the injected fuel. Moreover, although having a minimized passage cross-section in area, the second injection passage portion 32 ensures a sufficient airflow which is directed toward the second intake port section 24. As a result, rapid supply of fuel from the second nozzle hole portion 36 toward the second intake port section 24 is attainable. Consequently, the fuel can be prevented from residing and adhering to respective inner wall surfaces of the second injection passage portion 32 and the second intake port section 24.

With continued reference to FIG. 3, the first injection passage portion 30 is shown formed to provide a fixed diameter $D_1$ at a location adjacent to the first nozzle hole portion 34 (the location designated by the "A" portion in FIG. 3). This configuration eliminates the adhesion of fuel to an inner wall surface defined by "A" portion, and further would reduce any influences even if fuel could be affixed thereto.

Figure 4:
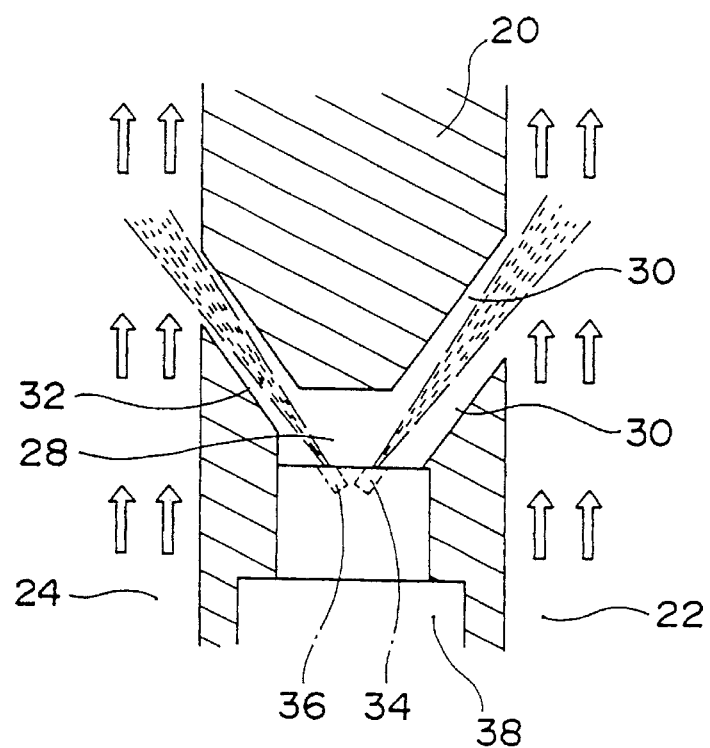

Referring now to FIG. 4, suction air is shown introduced from respective upstream sides of the first and second intake port sections 22 and 24 when the air intake control valve 26 remains open. At the same time, fuel issuing from the first and second nozzle hole portions 34 and 36 is fed into the first and second intake port sections 22 and 24 respectively through the first and second injection passage portions 30 and 32. Then, the fed fuel is smoothly introduced into the combustion chamber 4, together with respective airflows in the first and second intake port sections 22 and 24.

According to the first embodiment, the passage cross-section of the first injection passage portions 30 is greater in area than that of the second injection passage portion 32. When the air intake control valve 26 remains closed, the above structural feature prevents interruption in atomization of fuel to be injected into the first intake port section 22 through the first injection passage portion 30. At the same time, a sufficient airflow is positively provided for the second injection passage portion 32, whereby fuel is prevented from being lodged and affixed to the inner wall surface of the passage portion 32. Moreover, the first injection passage portion 30 provides reduced flow irregularity and less resistance to the injected fuel. In addition, the second injection passage portion 32, which has a minimized passage cross-section in area, can insure a sufficient airflow.

In addition, in order to form the first and second injection passage portions 30 and 32, only one cutting operation using tools such as drills having different diameters is necessary. As a result, a shorter cutting or machining process is achievable.

Figure 5:
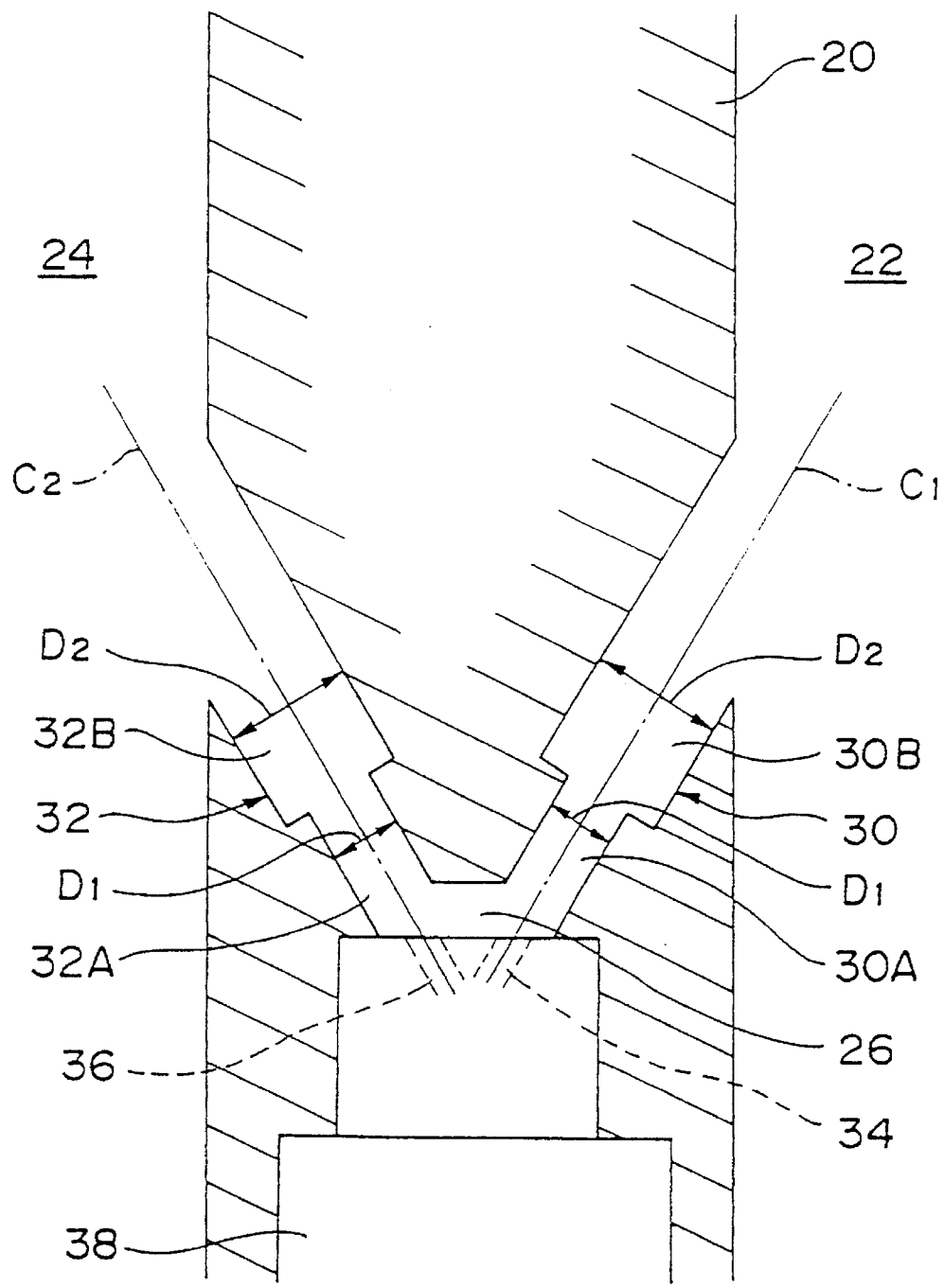
FIG. 5 is an enlarged, cross-sectional view showing a primary portion of the air suction system according to a second embodiment.
Figure 6:
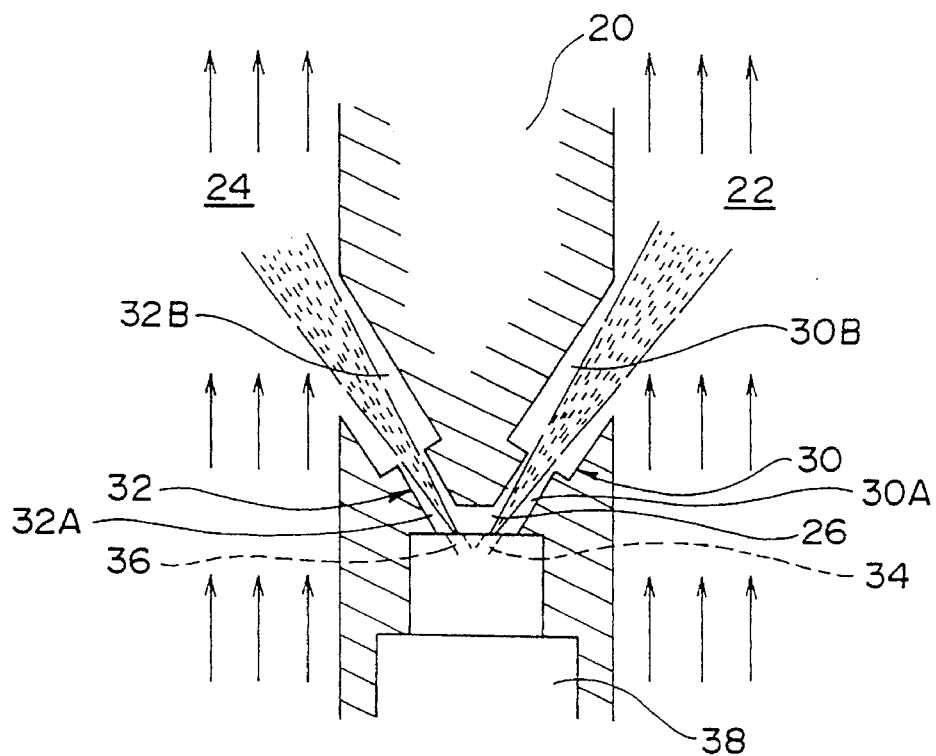
FIG. 6 is an enlarged, cross-sectional view corresponding to FIG. 5 showing an opened state of the air intake control valve.
Figure 7:
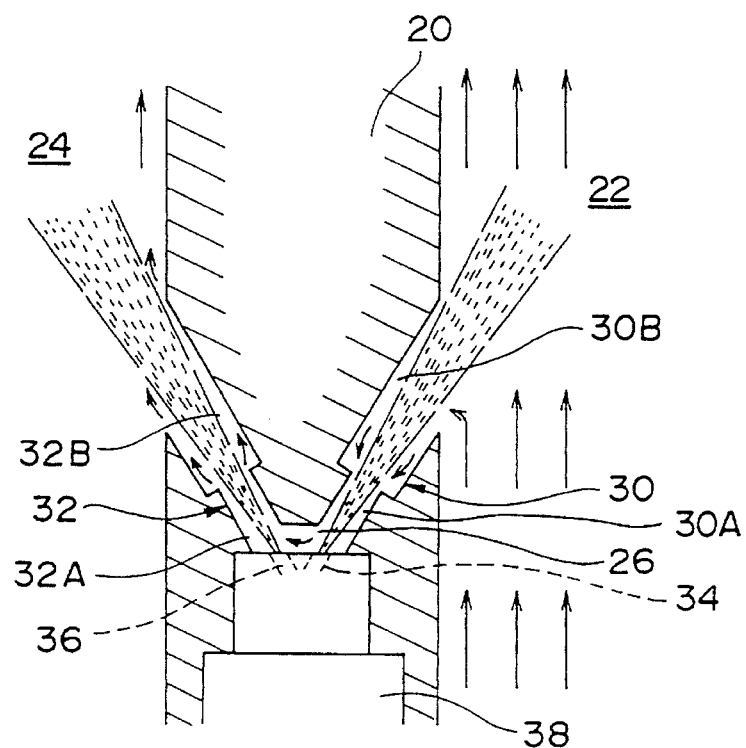
FIG. 7 is an enlarged, cross-sectional view corresponding to FIG. 6 but showing a closed state of the air intake control valve.

Embodiment of FIGS. 5–7:

A second embodiment of the invention will now be described with reference to FIGS. 5–7, which respectively correspond to FIGS. 2–4. Corresponding parts of the second embodiment are designated by the same reference numerals utilized above.

In this variation of the air suction system, the first and second injection passage portions 30 and 32 are configured in such a manner that respective passage cross-sections thereof in the vicinity of the first and second nozzle hole portions 34 and 36 have an area equal to a predetermined smaller cross-sectional area S1. In addition, the first and second injection passage portions 30 and 32 are formed in such a manner that respective passage cross-sections thereof on the sides of the first and second intake port sections 22 and 24 have an area equivalent to a predetermined larger cross-sectional area S2. The latter area S2 is greater than the former area S1 (i.e., $S1 \leq S2$).

More specifically, as illustrated in FIG. 5, the first injection passage portion 30 includes a first nozzle hole-side injection passage portion 30A and a first port-side injection passage portion 30B along the first centerline C1. The second injection passage portion 32 includes a second nozzle hole-side injection passage portion 32A and a second port-side injection passage portion 32B along the second centerline C2. While being directed toward the combustion chamber 6, the centerlines C1 and C2 extend linearly from the nozzle holes 34 and 36, respectively. The aforesaid nozzle hole-side injection passage portions 30A and 32A are respectively located adjacent to the nozzle holes 34 and 36. The aforementioned port-side injection passage portions 30B and 32B are respectively located on the sides of the intake port sections 22 and 24.

One ends of the injection passage portions 30A and 32A communicate with one another at the convergence portion 28. The same passage portions 30A and 32A are formed in such a manner that respective passage cross-sections thereof have an area equivalent to the predetermined smaller cross-sectional area S1. Further, the passage portions 30A and 32A are formed to provide respective passage cross-sections in the form of a circular hole having a predetermined smaller diameter D1. The preceding area and shape of the passage cross-section are established so as to ensure a proper stream flow of air from the first intake port section 22 to the second intake portion sections 24 without creating a reduced swirl ratio during air suction.

One end of the first port-side injection passage portion 30B communicates with the other end of the first nozzle hole-side injection passage portion 30A. The other end of the passage portion 30B opens into the first intake port section 22. One end of the second port-side injection passage portion 32B communicates with the other end of the second nozzle hole-side injection passage portion 32A. The other end of the passage portion 32B leads into the second intake port section 24. The passage portions 30B and 32B are formed in such a manner that respective passage cross-sections thereof have an area equal to the predetermined larger cross-sectional area S2. The cross-sectional area S2 is greater than the aforementioned area S1 (i.e., S1≦S2). In addition, the passage portions 30B and 32B are formed to provide respective passage cross-sections in the form of a circular hole having a predetermined larger diameter D2. The diameter D2 is greater than the aforesaid diameter D1 (i.e., D1≦D2).

As a result, the first and second injection passage portions 30 and 32 are each formed linearly into a cylindrical shape having a staged or stepped shaped, formed of: the circular hole-shaped, first and second nozzle hole-side injection passage portions 30A and 32A having the predetermined smaller cross-sectional area S1; and the circular hole-shaped, first and second port-side injection passage portions 30B and 32B having the predetermined larger cross-sectional area S2.

Referring now to the convergence portion 28, the area and shape of the passage cross-section thereof are established so as to maintain a proper stream flow of air from the first intake port section 22 to the second intake port sections 24 without reducing swirl ratio during air aspiration.

The operation of the second embodiment will now be described with reference to FIGS. 6 and 7.

FIG. 6 illustrates a flow of fuel which is expelled from first and second nozzle hole portions 34 and 36 of a fuel injection valve 38 when first and second inlet valves 10-1 and 10-2 as well as air intake control valve 26 are all opened. The expelled fuel flows into first and second intake port sections 22 and 24 after being driven through first and second injection passage portions 30 and 32 from first and second nozzle hole-side portions 30A and 32A to first and second port-side portions 30B and 32B.

The fuel now in the first and second intake port sections 22 and 24 is then drawn into the combustion chamber 4 via first and second air inlets 8-1 and 8-2, together with respective currents of air flowing in these two intake port sections 22 and 24.

Referring now to FIG. 7, attention is directed to a flow of fuel which issues from the first nozzle hole portion 34 when the first and second inlet valves 10-1 and 10-2 are opened, but the intake control valve 26 is closed. The fuel is forced into the first intake port section 22 from the first nozzle hole-side passage portion 30A through the first port-side passage portion 30B. The fuel is then admitted into the combustion chamber 4 via the first inlet 8-1, together with an airstream flowing in the first intake port section 22.

At that time, some of the airstream flowing from an upstream side of the first intake port section 22 is diverted into the first injection passage portion 30. The diverted airstream is further advanced into the second injection passage portion 32 through the convergence portion 28. The diverted airstream then flows into the second intake port section 24.

The airstream, which flows from the first intake port section 22 into the second intake port section 24, provides the following flow of the fuel that is ejected from the second nozzle hole portion 36. That is, the ejected fuel is blown into the second intake port section 24 from the second nozzle hole-side passage portions 32A through the second port-side passage portion 32B. The fuel is then drawn into the combustion chamber 4 via the second inlet 8-2.

The first and second injection passage portions 30 and 32 are fabricated in such a manner that respective passage cross-sections thereof in proximity to the first and second nozzle hole portions 34 and 36 have a size corresponding with a predetermined smaller cross-sectional area S1. Further, the first and second injection passage portion 30 and 32 are constructed in such a manner that respective passage cross-sections thereof on the sides of the first and second intake port sections 22 and 24 have a size corresponding with a predetermined larger cross-sectional area S2 (S1≦S2).

This arrangement enables the air suction system to ensure an appropriate stream flow of air from the first intake port section 22 to the second intake port section 24; such airstream flow eliminates a reduction in swirl ratio during air suction. Further, as a result of the proper stream flow of air, the air suction system enables fuel ejected through the second injection passage portion 32 to be introduced into the second intake port section 24 without allowing the fuel to stagnantly adhere to a wall surface of the same intake port section 24.

Furthermore, the air suction system has the first and second injection passage portions 30 and 32 configured in such a manner that respective passage cross-sections thereof on the sides of the first and second intake port sections 22 and 24 have an area equal to the predetermined larger cross-sectional area S2 which is greater than the predetermined smaller cross-sectional area S1. This configuration allows for ejection of fuel in a wider range of injection without permitting the fuel to impinge on respective wall surfaces of the first and second injection passage portions 30 and 32. As a result, the air suction system is capable of driving fuel to flow through the first and second injection passage portions 30 and 32 without allowing the fuel to stagnate and adhere to these injection passage portions 30 and 32.

In addition, the air suction system has the first and second injection passage portions 30 and 32 each formed linearly into a cylindrical shape having a staged or stepped portion. Consequently, the air suction system has better processability.

Figure 8:
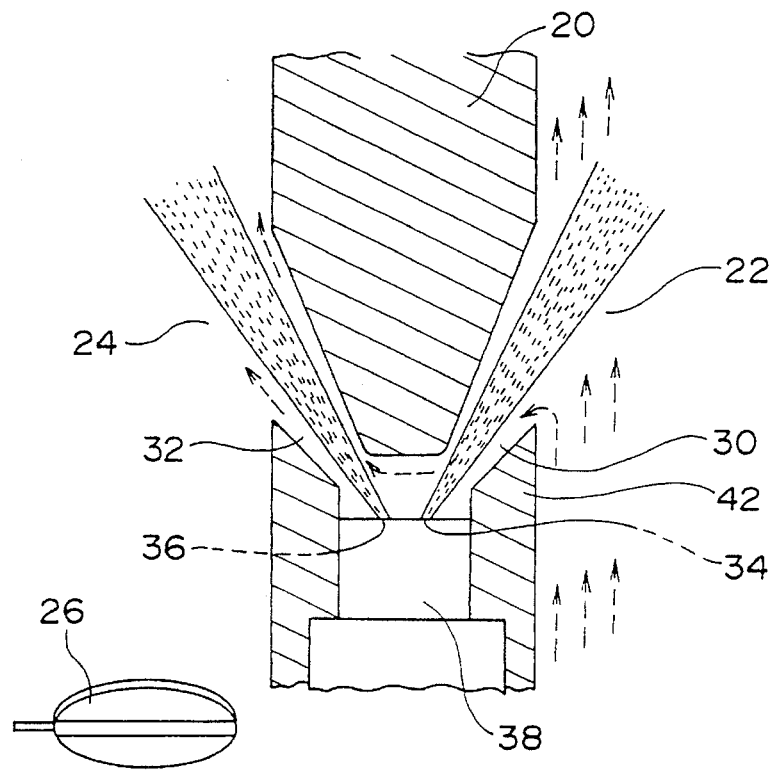
FIG. 8 is a schematic enlarged, cross-sectional view illustrating a fuel injection valve portion of a third embodiment at the closing time of an air intake control valve.
Figure 9:
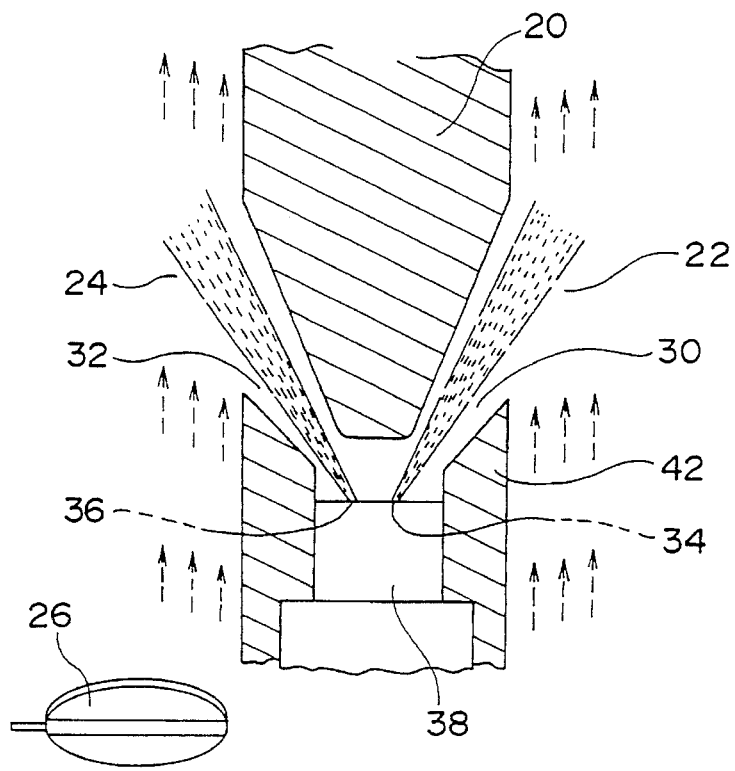
FIG. 9 is a schematic enlarged, cross-sectional view illustrating the fuel injection valve portion of the third embodiment at the opening time of the air intake control valve.

Embodiment of FIGS. 8 and 9:

FIGS. 8 and 9 illustrate a third embodiment of the invention, wherein the same reference numerals are again used to designate the same parts or components described above.

In this variation, the first and second communication passages 30 and 32 are formed with taper-shaped configurations such that the area of each passage cross-section increases in a stepped manner in a direction toward the respective first and second intake ports 22 and 24.

In greater detail, when the fuel injection valve 38 is held in position by a retaining portion 42 of the partition 20, the first and second communication passages 30 and 32 are defined by two members: the partition wall 20, and an end portion of the retaining portion 22 thereof. At this time, each of the communication passages 30 and 32 forms a tapered shape such as to be progressively greater in cross-sectional area in a flow direction toward the first and second intake ports 22 and 24 and away from the location of the air intake control valve 26.

In operation, and Referring to FIG. 8, when the air intake control valve 26 is closed, some of an airstream flowing from an upstream side of the first intake port 22 is shown introduced into the second intake port 24 from the second communication passage 32 through the first communication passage 30.

The partially introduced airflow prevents fuel from stagnantly adhering to a wall surface of the second intake port 24 when the fuel is injected from the fuel injection valve 38 into the second intake port 24.

As shown in FIG. 9, when the air intake control valve 26 is opened, respective air currents flow in the first and second intake ports 22 and 24. At the same time, fuel to be injected from the fuel injection valve 38 into the first and second intake ports 22 and 24 respectively is driven through the first and second communication passages 30 and 32 respectively before being introduced into these two intake ports 22 and 24. Then, the introduced fuel is supplied to the internal combustion engine via the first and second intake ports.

As a result of the taper-shaped, first and second communication passages 30 and 32, there is no likelihood that, when the air intake control valve 26 is closed, an air current overflows into the air intake port which is located on the side of the control valve 26. This feature makes it possible to prevent a considerable reduction in a swirl ratio and further to insure an airflow sufficient to preclude fuel stagnation in the air intake port, which is positioned on the side of the air intake control valve 26, as well as fuel adhesion to the wall surface of the same air intake port.

Furthermore, the taper-shaped formation of the first and second communication passages 30 and 32 obviates a sudden change in the area of each passage cross-section thereof. As a result, the first and second communication passages 30 and 32 provides a smooth airflow therein and hence a reduced loss thereof.

Moveover, when the communication passages 30 and 32 are formed into taper-shaped configurations which are identical to a dispersion shape of fuel to be injected from the fuel injection valve, the injected fuel can positively be prevented from adhering to respective wall surfaces of these communication passages.

In addition, the taper-shaped, first and second communication passages 30 and 32 eliminate the chance that an airstream overflows into the second intake port 24 when the control valve 26 is in a closed state, as the air intake control valve 26 is located midway along the second intake port 24. This feature makes it possible to prevent a significant reduction in swirl ratio and insure an airflow sufficient to preclude fuel residence in the second intake port 24 as well as fuel adhesion to the wall surface of the same intake port.

Figure 10:
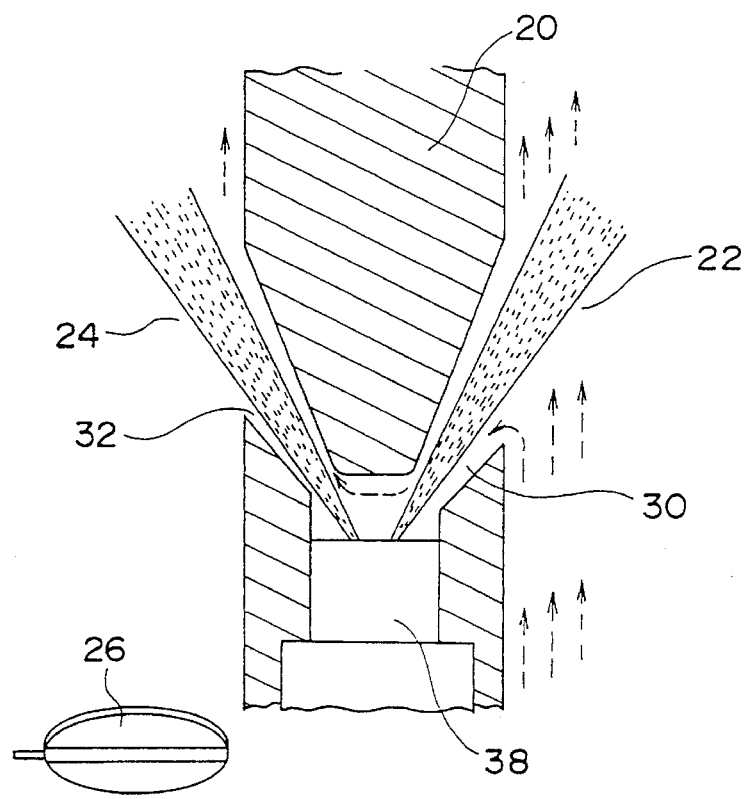
FIG. 10 is a schematic enlarged, cross-sectional view showing a fuel injection valve portion at the closing time of an air intake control valve according to a fourth embodiment.
Figure 11:
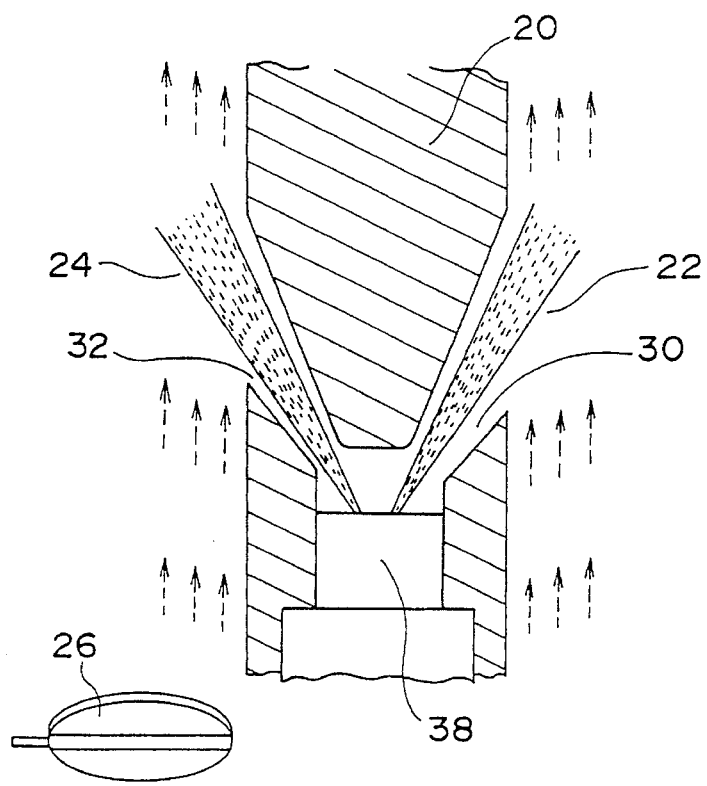
FIG. 11 is a schematic enlarged, cross-sectional view showing the fuel injection valve portion at the opening time of the air intake control valve according to the fourth embodiment.

Embodiment of FIGS. 10 and 11:

FIGS. 10 and 11 illustrate a fourth embodiment of the invention. In the following description on this embodiment, the same reference numerals are given for components serving the same function as in the prior embodiments.

The fourth embodiment is characterized in that a passage cross-section of the second communication passage 32 is formed to be smaller in area than that of a first communication passage 30. The second communication passage 32 communicates with a second intake port 24. The second intake port 24 has an air intake control valve 26 provided midway therealong. These passages 30 and 32, however, are again of a taper-shaped formation as in the FIGS. 8–9 embodiment.

When the passage cross-section of the first communication passage 30 (FIGS. 10–11) is formed to be identical in area, for example, to the aforesaid FIGS. 8–9 embodiment, the passage cross-section of the second communication passage 32 (FIGS. 10–11) is formed to be smaller in area than that of the communication passage 30. This configuration reduces the influence from the side of the second intake port 24, thereby providing a reduced irregularity of flow in the first intake port 22 and less resistance to fuel injected from the fuel injection valve 38.

In addition, even when the second communication passage 32 is established to provide a minimized passage cross-section in area, the taper-shaped formation of the first and second communication passages 30 and 32 obviates the possibility that an air current overflows into the second intake port 24, as is the case with the aforementioned FIGS. 8–9 embodiment. As a result, it is possible to prevent a substantial reduction in swirl ratio and further to insure an airflow sufficient to preclude fuel stagnation in the second intake port 24 as well as fuel adhesion to the wall surface of the same intake port 24.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an air suction system for an internal combustion engine in which an air intake port of said internal combustion engine is partitioned by a partition wall into first and second intake port sections which separately communicate with a single combustion chamber of said internal combustion engine, said second intake port section being provided with an air intake control valve which selectively provides opening and closing actions depending on an engine-running state, said partition wall being defined with first and second injection passage portions whose one ends are joined together at a location of said partition wall, the other ends of said first and second injection passage portions being respectively in communication with said first and second intake port sections on a downstream side of said air intake control valve, the other ends of said first and second injection passage portions being oriented toward said combustion chamber, said partition wall being provided with a fuel injection valve which has first and second nozzle hole portions directed toward said combustion chamber respectively through said first and second injection passage portions, the improvement wherein a passage cross-section of said first injection passage portion is greater in area than that of said second injection passage portion.

2. In an air suction system for an internal combustion engine in which an air intake port of said internal combustion engine is partitioned by a partition wall into first and second intake port sections which separately communicate with a single combustion chamber of said internal combustion engine, said second intake port section being provided with an air intake control valve which selectively provides opening and closing actions depending on an engine-running state, said partition wall being defined with first and second injection passage portions whose one ends are joined together at a location of said partition wall, the other ends of said first and second injection passage portions being respectively in communication with said first and second intake port sections on a downstream side of said air intake control valve, the other ends of said first and second injection passage portions being oriented toward said combustion chamber, said partition wall being provided with a fuel injection valve which has first and second nozzle hole portions directed toward said combustion chamber through said first and second injection passage portions, the improvement wherein said first and second injection passage portions are configured in such a manner that respective passage cross-sections thereof adjacent to said first and second nozzle hole portions have an area equal to a predetermined smaller cross-sectional area, and wherein said first and second injection passage portions are configured in such a manner that respective passage cross-sections thereof on the sides of said first and second intake port sections have an area equal to a predetermined larger cross-sectional area, said predetermined larger cross-sectional area being greater than said predetermined smaller cross-sectional area.

3. In an air suction system for an internal combustion engine in which a downstream side of an air intake port communicating with said internal combustion engine is branched into first and second intake ports, one of which is provided with an air intake control valve for opening and closing said one of said first and second intake ports, a fuel injection valve being positioned to inject fuel into said first and second intake ports through respective first and second communication passages at respective locations on a downstream side of said air intake control valve, the improvement wherein said first and second communication passages are formed with taper-shaped configurations such that the area of each passage cross-section increases in a direction toward said first and second intake ports.

4. A system according to claim 3, wherein said air intake control valve is in said second intake port, and wherein said first communication passage has a cross-sectional area which is greater than the cross-sectional area of said second communication passage.

* * * * *